UNITED STATES PATENT OFFICE.

JACOB HUSNIK, OF PRAGUE, AUSTRIA-HUNGARY.

MAKING RELIEF-PLATES BY PHOTOGRAPHY.

SPECIFICATION forming part of Letters Patent No. 473,753, dated April 26, 1892.

Application filed July 22, 1889. Serial No. 318,310. (No specimens.)

*To all whom it may concern:*

Be it known that I, JACOB HUSNIK, a subject of the Emperor of Austria-Hungary, residing in Prague, in the Empire of Austria-Hungary, have invented certain new and useful Improvements in Relief-Plates, of which I declare the following to be a full, clear, and exact description.

The object of my invention is the production of gelatine relief-plates, which reproduce the finest details of outlines or shaded figures in a very successful and artistic manner.

The films of gelatine are prepared as follows: One kilogram of soft gelatine is mixed with twenty-five cubic centimeters of glycerine and six liters of water. This is dissolved in a water bath and filtered afterward. Large sheets of strong paper or carton which have been immersed in water for about five minutes are stretched upon a plate of glass horizontally and small rims or flaps are formed on their edges. A layer of about three-quarters of a millimeter in thickness of the gelatine solution is poured upon said paper. After sufficient hardening of the gelatine sheets they are hung up to dry. After that they can be kept in store for years ready for use at any time.

The method of preparing the gelatine reliefs is the following: The sheets of gelatine just mentioned are to be bathed for ten minutes in a solution of one part of potassium bichromate, twenty-five parts of water, and as much caustic ammonium as will make the bath yellow. The sheet is then spread upon a sheet of glass which has been covered with a film of wax in the same way as is done in the preparation of the so-called "pigment-papers." The gelatine must then be dried in the dark. The sensitive sheet is then exposed under the negative glass, or, in case of a figure with shades, under the positive glass, in the sun for about half an hour. The figure appears brown on a light-yellow ground. The sensitive sheet is then laid in a large zinc dish or any other appropriate vessel and a concentrated solution of sodium bichromate (1.8) is poured upon it. The sheet has to be rubbed with said solution by means of a brush, which must not be too stiff, or in any other way, so as to take off the superfluous gelatine from the carton or paper. The drawing remains upon it in elevated lines or traces. The relief is then washed and dried. After this it is ready for use.

Having described my invention, what I claim as new, and desire to secure by Letters Patent, is—

The method of making relief-plates, which consists in applying a layer of gelatine solution to a suitable paper, then drying the same, then bathing the sheet in a solution of potassium bichromate and caustic ammonium, then spreading the sheet upon a glass covered with a film of wax, then drying the same in the dark, then exposing the sheet under the desired design to the sun, then pouring a solution of bichromate of sodium upon the sheet and removing the superfluous gelatine, and then washing and drying the sheet, as set forth.

In witness whereof I have hereunto set my hand in presence of two witnesses.

JACOB HUSNIK.

Witnesses:
A. HELLER,
ADOLF FIRCHEY.